US 10,146,254 B2

United States Patent
Codner

(10) Patent No.: US 10,146,254 B2
(45) Date of Patent: Dec. 4, 2018

(54) SHADE ELEMENT FOR CELL PHONES AND TABLET COMPUTERS

(71) Applicant: Cynthia Codner, Cape Canaveral, FL (US)

(72) Inventor: Cynthia Codner, Cape Canaveral, FL (US)

(*) Notice: Subject to any disclaimer, the term of this patent is extended or adjusted under 35 U.S.C. 154(b) by 0 days.

(21) Appl. No.: 15/461,347

(22) Filed: Mar. 16, 2017

(65) Prior Publication Data

US 2017/0269642 A1    Sep. 21, 2017

Related U.S. Application Data

(60) Provisional application No. 62/311,343, filed on Mar. 21, 2016.

(51) Int. Cl.
 *G06F 1/16* (2006.01)
 *H04M 1/02* (2006.01)

(52) U.S. Cl.
 CPC .......... *G06F 1/1601* (2013.01); *G06F 1/1603* (2013.01); *H04M 1/0266* (2013.01)

(58) Field of Classification Search
 CPC .................................................. G06F 1/1603
 See application file for complete search history.

(56) References Cited

U.S. PATENT DOCUMENTS

| | | | | |
|---|---|---|---|---|
| 3,961,159 A * | 6/1976 | Hursey | ................... | G06F 15/02 235/1 D |
| 5,121,253 A * | 6/1992 | Waintroob | ............... | H04N 5/65 348/834 |
| 5,717,566 A * | 2/1998 | Tao | ........................ | G06F 1/1603 348/834 |
| 9,806,756 B1 * | 10/2017 | Jacobs | ................. | H04B 1/3888 |
| 2006/0279916 A1 * | 12/2006 | Boudreau | ............. | G06F 1/1603 361/679.26 |
| 2007/0075975 A1 * | 4/2007 | Aguilera | ............... | G06F 1/1603 345/169 |
| 2013/0229715 A1 * | 9/2013 | Allen | ..................... | G02B 27/04 359/613 |
| 2014/0349719 A1 * | 11/2014 | Chun | ...................... | H04M 1/04 455/575.1 |
| 2016/0227663 A1 * | 8/2016 | Holmes | ................. | G06F 1/1603 |

* cited by examiner

*Primary Examiner* — Duc M Nguyen
(74) *Attorney, Agent, or Firm* — William Lovin & Associates, LLC; William R. Lovin

(57) ABSTRACT

The present invention relates to devices used to shade the screens of cell phones and tablet computers from bright sunlight. More specifically the present invention relates to a shade element attached around the body of a cell phone or tablet computer for protecting the screen of the cell phone or tablet computer from bright sunlight when the device is held and used by a user.

10 Claims, 3 Drawing Sheets

SHADE ELEMENT FOR CELL PHONES AND TABLET COMPUTERS

CROSS-REFERENCE TO RELATED APPLICATIONS

This application takes reference to U.S. Prov. Pat. App. No. 62/311,343 filed Mar. 21, 2016 and incorporates it in its entirety by reference.

FIELD OF THE INVENTION

The present invention relates to devices used to shade the screens of cell phones and tablet computers from bright sunlight. More specifically the present invention relates to a shade element attached around the body of a cell phone or tablet computer for protecting the screen of the cell phone or tablet computer from bright sunlight when the device is held and used by a user.

BACKGROUND OF THE INVENTION

Bright sunlight is a challenge to users of cell phones and tablet computers because the screen of the cell phone or tablet computer is usually not bright enough to be seen when the sun is shining brightly. Walking about town, on the beach, or riding in an automobile are all environments in which bright sunlight degrades the visual presentation of cell phones and tablet computers so that they are essentially useless in the bright sunlight.

Of course the operator of the cell phone or tablet computer may adjust the brightness of the display to deliver a more readable presentation. But, such an increase sharply reduces the life of the battery powering the cell phone or tablet computer. Manufacturers of cell phones and tablet computers may incorporate displays capable of creating greater illumination (increasing the number of Nits or units of luminance equivalent to one candela per square meter) but such devices also deplete the battery of the device more quickly.

Simply put, the optimal solution would be to create a shade element for the display of the cell phone or tablet computer that may be semi-permanently attached to the cell phone or tablet computer. Such a shade element would block the direct rays of the sun from impinging on the display of the cell phone or tablet computer making it easier to operate the device in bright sunlight at battery efficient display brightness settings.

Accordingly, it is a first goal of the present invention to provide a semi-permanently attachable shade element that may be attached to a cell phone or tablet computer.

It is a second goal of the present invention to provide a semi-permanently attachable shade element comprised of rigid material.

It is a third goal of the present invention to provide a semi-permanently attachable shade element comprised of flexible material.

SUMMARY OF THE INVENTION

The present invention comprises a substantially rectangular shade pad transversely supported at an angle above the display of the cell phone or tablet computer. The shade pad is attached to the cell phone or tablet computer by means of two side blocks attached to a back block. The shade pad extends a short distance forward from and downward with respect to the display panel of the cell phone or tablet computer. The rectangular shape of the present invention when viewed from above is designed to tightly grip the exterior surface of the cell phone or tablet computer so that the present invention may be positioned at any point along the length of the cell phone or tablet computer.

The present invention may be constructed of rigid or flexible material or any combination thereof. For example, the back block; or, the back block and side blocks; or, the back block, side blocks, and shade pad may be comprised of rigid or flexible material or any combination thereof.

The present invention is used in the following manner: First, the invention is positioned above the top or below the bottom of the cell phone or tablet computer. Next, the user slightly expands the rectangular space formed by the shade pad, the side blocks and the back block and slips the invention over the cell phone or tablet computer. Next, the user releases the shade pad, the side blocks, and the back block to allow the invention to grasp the exterior of the cell phone or tablet computer. Next, the user uses the cell phone or tablet computer. When done, the user slightly expands the rectangular space formed by the shade pad, side blocks, and back block and removes the invention from the cell phone or the tablet computer.

DETAILED DESCRIPTION OF THE EMBODIMENTS

Figure 1:
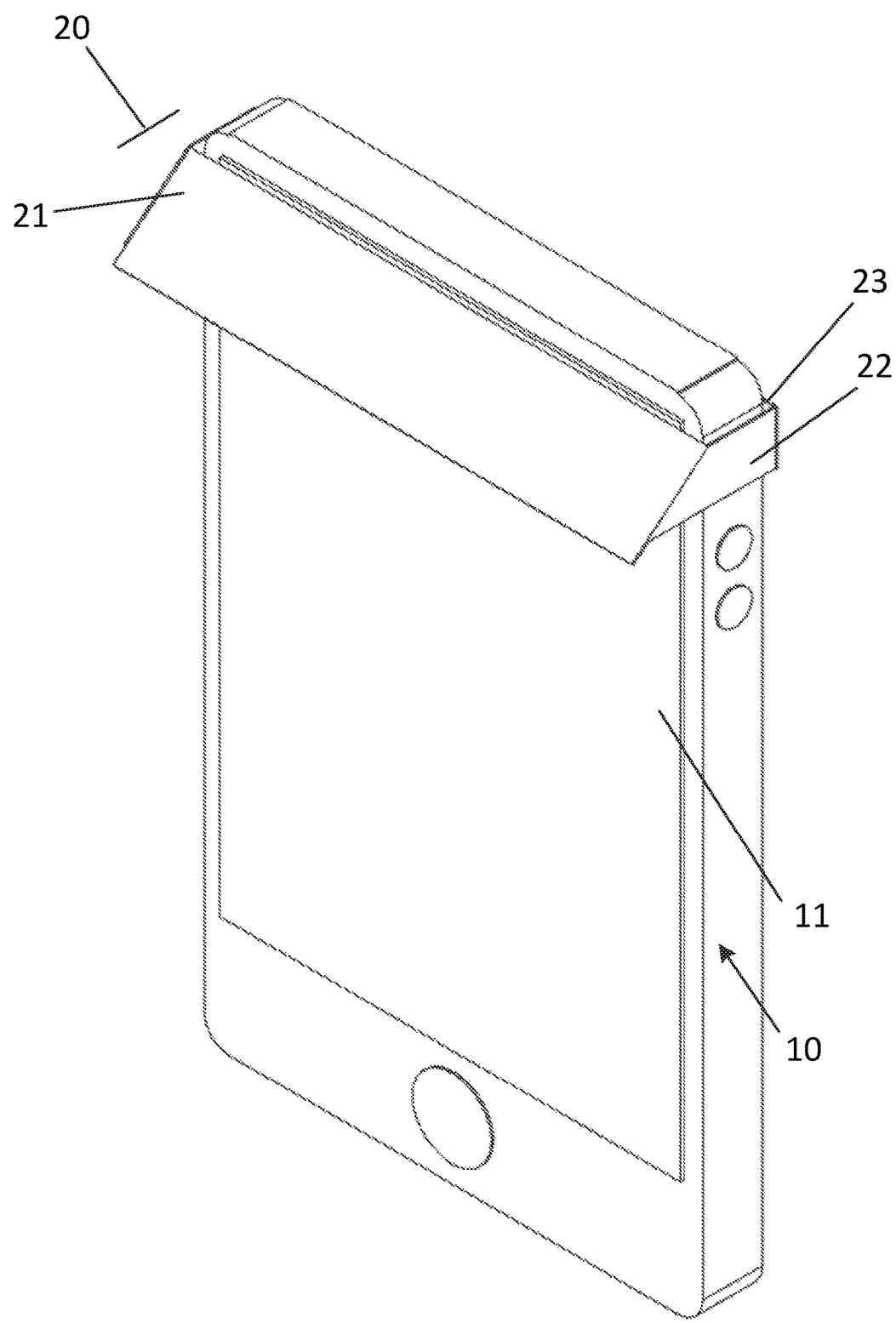
FIG. 1 comprises a first perspective view of the front of one embodiment of a shade element for cell phones and tablet computers for use with a cell phone or tablet computer.
Figure 2:
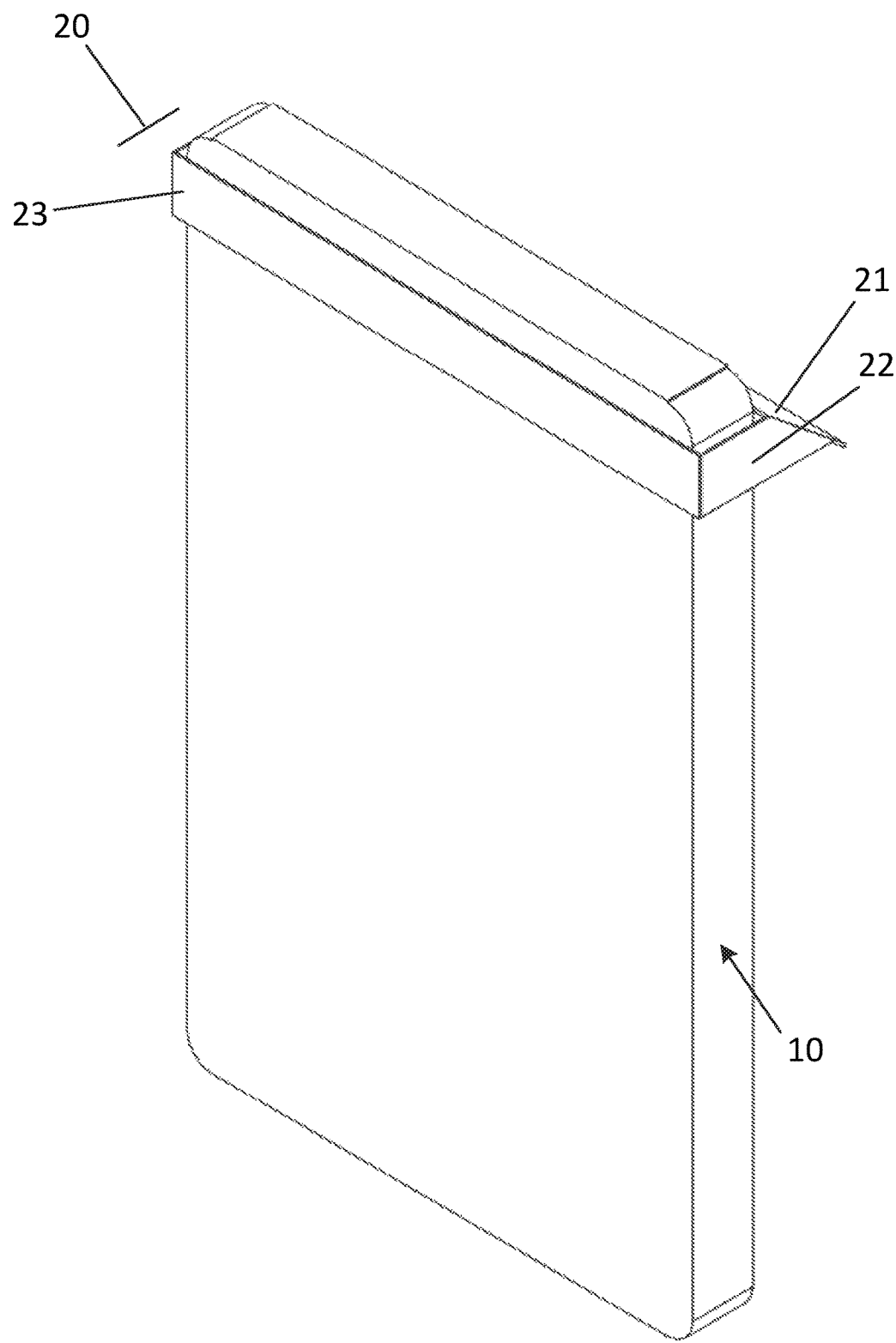
FIG. 2 comprises a second perspective view of the rear of one embodiment of a shade element for cell phones and tablet computers for use with a cell phone or tablet computer.
Figure 3:
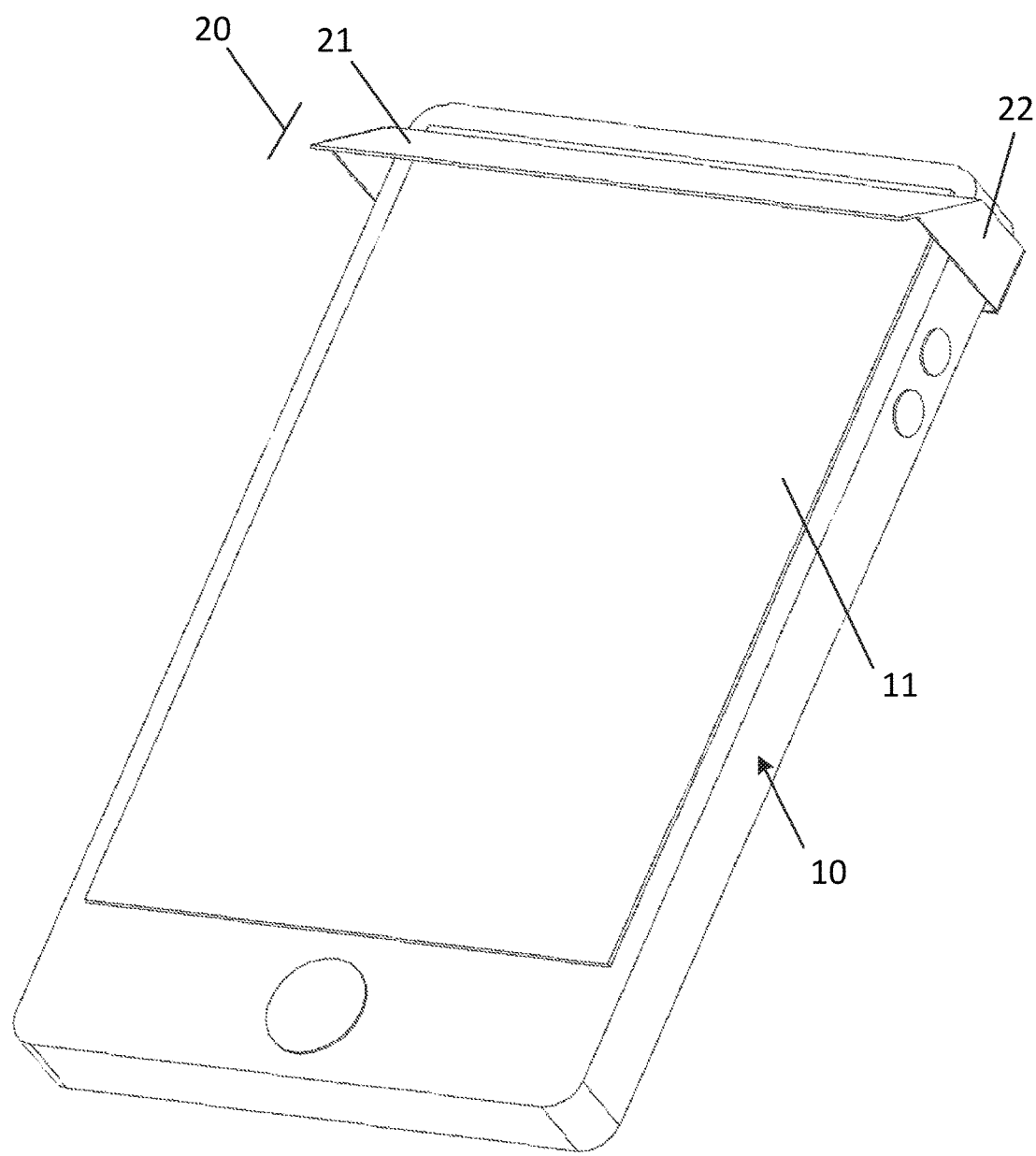
FIG. 3 comprises a third perspective view of one embodiment of the front of one embodiment of a shade element for cell phones and tablet computers for use with a cell phone or tablet computer shown from the angle a user will use the invention.

Referring now to FIGS. 1, 2, and 3, a first embodiment of a shade element for cell phones and tablet computers 20 is shown. In this form, the present invention comprises a generally rectangular shade pad 21 constructed of rubber, plastic, cloth or some similar elastic material. Side blocks 22 and back block 23 are similarly comprised of rubber, plastic, cloth or a similar elastic material. By the same token, the shade element for cell phones and tablet computers 20 may be comprised of rigid materials such as hard plastic or metal. Similarly, shade element for cell phones and tablet computers 20 may be comprised of a combination of rigid and elastic materials. For example, shade pad 21 may be plastic coated metal and side blocks 22 and back block 23 may be stretching fabric. Many such equivalent fabrication materials and techniques are well known in the prior art and will not be discussed further so as to not detract from the clarity of the present disclosure.

Shade element for cell phones and tablet computers 20 is not limited to the depicted shape or size. To the contrary, shade element for cell phones and tablet computers 20 can be made in virtually any shape or size. However, shade element for cell phones and tablet computers 20 must possess a sufficiently long shade pad 21 to adequately protect the screen 11 of cell phone or tablet computer 10 from the sun's rays. Similarly, the depicted embodiment discloses a continuous construction method wherein shade pad 21, side blocks 22, and back block 23 are continuously constructed with no gaps or joined discontinuities. This does not mean that shade element for cell phones and tablet computers 20 cannot possess gaps or joined discontinuities. To the contrary, shade element for cell phones and tablet computers 20 may have gaps or joined discontinuities. Further, such gaps or discontinuities may be joined by any conceivable joining method such as Velcro®, clips, hooks, etc. Also, shade pad 21, side blocks 22, and back block 23 may individually or separately be constructed of flexible, tensile material such that each or individual elements may stretch slightly when placed over the cell phone or tablet computer 10. Also, shade pad 21, side blocks 22, and back block 23 may individually or separately possess decorative elements or markings. Also, shade pad 21, side blocks 22, and back block 23 may individually or separately possess protective surfaces on those aspects of themselves that make physical contact with cell phone or tablet computer 10. Such protective surfaces would limit scratching and/or accentuate the grip of the invention on the cell phone or tablet computer 10.

The present invention is used in the following manner: First, shade element for cell phones and tablet computers 20 is positioned above the top or below the bottom of cell phone or tablet computer 10. Next, the user slightly expands the rectangular space formed by shade pad 21, side blocks 22, and back block 23 and slips shade element for cell phones and tablet computers 20 over the cell phone or tablet computer 10. Next, the user releases shade pad 21, side blocks 22, and back block 23 to allow shade element for cell phones and tablet computers 20 to grasp the exterior of cell phone or tablet computer 10. Next, the user uses cell phone or tablet computer 10 and interacts with it via screen 11. When done, the user slightly expands the rectangular space formed by shade pad 21, side blocks 22, and back block 23 and removes shade element for cell phones and tablet computers 20 from cell phone or the tablet computer 10 when the user has completed use of the cell phone or tablet computer.

While the present invention has been described in what is thought to be the most useful variant, those skilled in the art will readily recognize that equivalent arrangements are easily constructed. All such variants that seek to alter: 1) The flexible or rigid materials out of which shade element for cell phones and tablet computers 20 is constructed; 2) The shape and configuration of shade pad 21; 3) The general shape of shade element for cell phones and tablet computers 20, particularly whether shade element for cell phones and tablet computers 20 covers the device and a protective skin or shell; and, 4) Variations in the size, location, and number of closable gaps or discontinuities in shade element for cell phones and tablet computers 20 are implicitly included in the spirit and scope of the present invention.

What is claimed is:

1. A shade element for devices comprising:
   a) a shade pad;
   b) side blocks;
   c) a back block;
   d) all of which are continuously connected end to end such that the shade pad is connected on its left end to a first side block which is connected on its left end to the back block which is connected on its left end to a second side block which is connected on its left end to the shade pad; and
   e) the entire assembly is capable of being placed transversely around a device in which the shade pad blocks a portion of the display of the device from the rays of the sun and the entire assembly may be moved vertically up and down the body of the device.

2. A shade element for devices of claim 1 in which the device is a cell phone.

3. A shade element for devices of claim 1 in which the device is a tablet computer.

4. A shade element for devices of claim 1 constructed of at least some flexible material.

5. A shade element for devices of claim 4 in which the flexible material is cloth.

6. A shade element for devices of claim 4 in which the flexible material is cardboard.

7. A shade element for devices of claim 4 in which the flexible material is soft plastic.

8. A shade element for devices of claim 1 constructed of at least some rigid material.

9. A shade element for devices of claim 8 in which the rigid material is metal.

10. A shade element for devices of claim 8 in which the rigid material is hard plastic.

* * * * *